May 19, 1925.  1,538,512
J. CANNING
RECIPROCATING SAWING MACHINE
Filed July 5, 1919  2 Sheets-Sheet 2
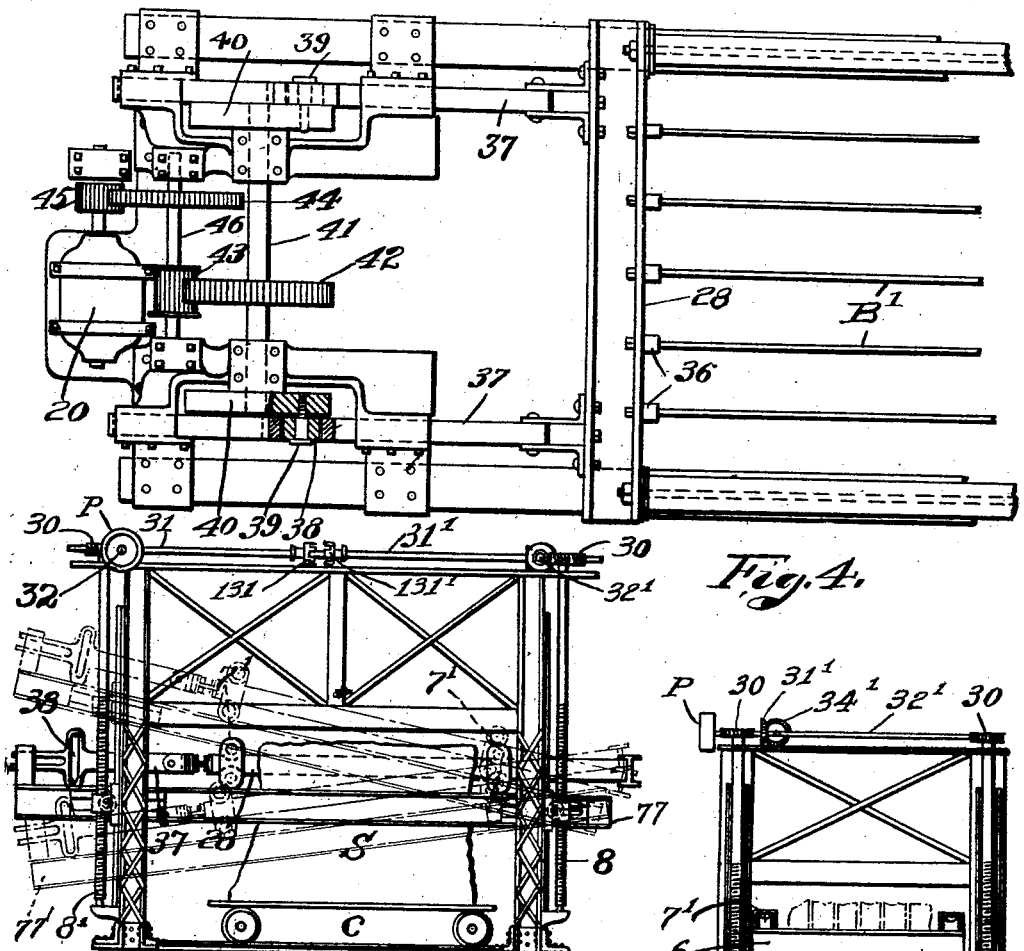
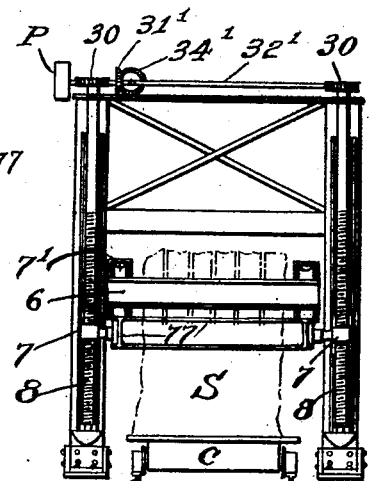
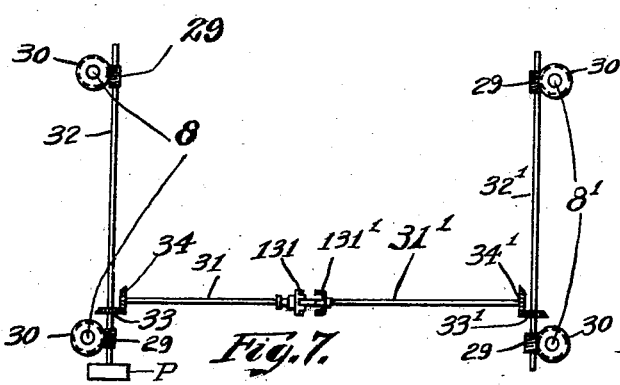
Inventor
James Canning
By Ellis Spear Jr.
Attorney Patented May 19, 1925.

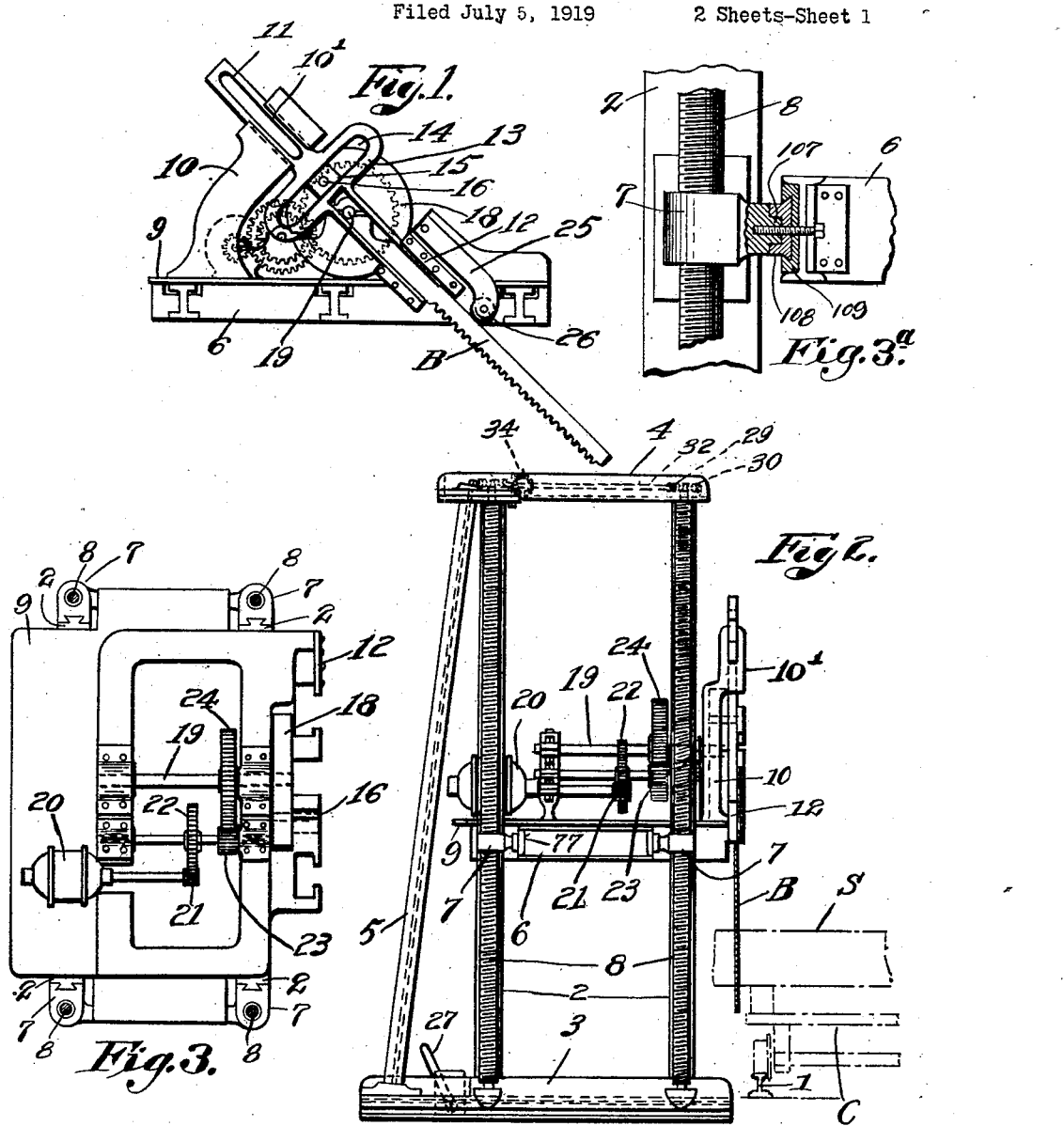

1,538,512

UNITED STATES PATENT OFFICE.

JAMES CANNING, OF MONTPELIER, VERMONT, ASSIGNOR TO LANE MANUFACTURING COMPANY, OF MONTPELIER, VERMONT, A CORPORATION OF VERMONT.

RECIPROCATING SAWING MACHINE.

Application filed July 5, 1919. Serial No. 308,894.

*To all whom it may concern:*

Be it known that I, JAMES CANNING, a citizen of the United States, residing at Montpelier, county of Washington, State of Vermont, have invented certain new and useful Improvements in Reciprocating Sawing Machines, of which the following is a specification.

My present invention relates to sawing machines and has particular reference to power driven stone cutting saws of the reciprocating type.

In sawing stone there is considerable difficulty in keeping the abrasive on the saw and avoiding the ejection of the abrasive from the kerf at the end of the stroke. There is furthermore obvious difficulty in providing a machine of this sort which will cut the harder varieties of stone smoothly and rapidly without working out of alignment. In addition, the saw must be so constructed and arranged as to be capable of practically a universal adjustment relative to the stone in order to make the various horizontal, vertical and angular cuts necessary in the shaping of the stone.

To the end therefore of providing a power driven sawing machine in which these difficulties are overcome and which is at the same time durable, serviceable and capable of proper adjustment, I have devised my present invention.

The machine disclosed in the following specification and illustrated in the drawings is one well adapted to practical cutting or trimming stone on a commercial basis. In the drawings:—

Fig. 1 is a side elevation of the saw supporting platform or carriage of a single saw machine in accordance with my invention.

Fig. 2 is an end elevation illustrating the manner of use thereof.

Fig. 3 is a plan view of the parts shown in Fig. 1.

Fig. 3ª is a detail view of the gib mechanism common to both the single and multiple blade saws for permitting tilting of the saw platform or carriage.

Fig. 4 is a plan view of the saw carriage or sash of a multiple blade saw embodying the principles of my invention.

Figs. 5 and 6 are side and end views thereof, illustrating the manner of use, and Fig. 7 is a plan view particularly illustrating the drive for the platform elevating screws employed in both types of saws.

For the purposes of this application I have illustrated my invention in its adaptation to power saws of both the single and multiple blade type. While the single saw machines are usually arranged in pairs on opposite sides of a trackway, as indicated at 1, I have shown only one machine, Figs. 1, 2, 3, it being understood that the other machine would be of like structure but of reversed set up.

The machine frame comprises columns 2 mounted on a heavy base 3 and cross framed at the top as indicated at 4 and suitably braced as indicated at 5. On the columns 2 is guided a vertically adjustable platform or carriage 6 which is supported by I-beams 77 that carry nuts or bearings 7 which travel on feed screws 8 and $8^1$ arranged in pairs.

Mounted on the carriage 6 is a bed 9 having a bracket 10. The bracket 10 has an inclined way $10^1$ in which is guided a reciprocating saw frame 11. Just forward of this way and slightly below it is a second way 12 secured to the bed 9 and in which the lower part of the saw frame 11 is guided, and intermediate of these bearings the frame is provided with a cross way 13 slotted at 14 to receive the slide block 15.

The slide block 15 is mounted on a wrist pin 16 set in the face of a heavy disc 18 on the main shaft 19. The shaft is driven by the motor 20 through a speed reducing train 21, 22, 23, 24. Mounted adjacent the lower bearings is the saw brace 25 having a roller 26 at its lower end bearing on the blade B to steady it and back it up adjacent to the stone indicated at S.

The blocks or slabs of stone are supported in a car C which may be advanced along the trackway 1 at the desired rate to take up the cut of the saw.

The stroke of the saw blade B gives therefore a diagonal cut and its reciprocation is progressively retarded at each end of the stroke. This retardation of the saw at each end of the stroke with the maximum speed in the middle of the sawing stroke eliminates to a very large extent the ejection of the chilled shot or other abrasive used in the kerf. This is effected by the resultant dwell of the block 15 in the slot 14 at the two phases of revolution of the disc 18, in which the block passes the central alignment of the saw. This structure also breaks the shock of the starting and stopping of the saw at that moment when the slide block 15 is in alignment with the saw.

The frame itself may be adjusted towards and from the car and locked in desired position as by the cam locking levers 27.

In the adaptation of my invention illustrated in Figs. 4, 5 and 6, the car or work support C travels under the saw carriage 6 between the supporting columns 2 of the frame work.

In these figures the bearings 7 which travel on the elevating screws 8 and $8^1$ are mounted upon I-beams 77 which support the carriage 6 and the saw frame or sash 28 is provided with grooved guide rolls $7^1$ adapted to track on the I-beams 77.

The saw blades B are individually clamped to the sash at 36 for relative adjustment, and the sash is reciprocated by mechanism which is substantially identical to the mechanism for operating the single saw blade of Figs. 1, 2 and 3.

As best illustrated in Fig. 4, the sash 28 is connected to slides 37 which are transversely slotted as indicated at 38, to receive slide blocks which are mounted upon wrist pins 39 set in the faces of crank discs 40 eccentrically to the axis of rotation of said discs. The discs 40 are fast on a crank shaft 41 which is driven from the motor 20 through a suitable reducing gear train 42, 43, 44, and 45. The crank shaft 41, counter shaft 46 and motor shaft are all journaled in suitable bearings, and the discs 40 are mounted at the ends of the crank shaft.

By this construction, the use of a long pitman for driving the gang is obviated. As the sash was raised or lowered, the angle of the pitman changed and caused an upward or downward pressure on the sash, according to the adjustment of the sash, which prevented the sash from running in a straight line and caused the saws to wear concaving in the center. My invention overcomes this objection and also secures a progressive retardation at each end of the stroke with maximum speed in the middle of the stroke.

In both the single and multiple blade type, the saw supporting platform and its motor, are arranged for tilting adjustment. This adjustment is permitted and controlled in the following manner. The four elevating screws 8 and $8^1$ in each embodiment of my invention are arranged for drive by pairs, so that one pair may be driven independently of the other whereby one end of the saw platform may be elevated or lowered while the opposite end remains stationary, permitting and holding a vertical sliding movement on the columns 2 of that end of the platform which is to be raised or lowered and a swiveling action of the entire platform as to the columns.

As here shown, the screw pair 8 is driven by a shaft 32 and the screw pair $8^1$ by a shaft $32^1$, as by worms 29 on said shafts meshing with pinions 30 on the screws. Power may be applied to shaft 32 as by the pulley P, and shafts 32 and $32^1$ may be connected as by the sectional cross shaft 31, $31^1$, and intermeshing gears 33, 34 and $33^1$, $34^1$. By making the cross shaft sectional and interposing between the shaft sections 31, $31^1$ a clutch mechanism 131, $131^1$, the screw pairs 8, $8^1$ may be driven independently of one another. When it is desired to simultaneously raise or lower both ends of the saw platform, the clutch mechanism 131, $131^1$ may be shifted to couple the shafts 32, $32^1$, for simultaneous drive.

The gib mechanism for permitting and holding these tilting adjustments is illustrated in connection with the showing of both the single and multiple blade saws, and is detailed in Fig. $3^a$. Referring particularly to Fig. $3^a$, the nuts or bearings 7 which embrace the feed screws 8 and $8^1$ are swiveled to the I-beams 77, as by the pin 107 and gib block 108. At that end of the saw platform which raises or lowers, here shown as the end carrying the scotch yoke and motor 20, the block 108 travels in a slide 109 rigidly attached to the I-beam 77 and both I-beam and slide are slotted to receive a bolt 110 tapped into pin 107 whereby the whole may be tightly clamped at the proper angle after the saw frame has been tilted. The block 108 at the opposite end of the saw frame, i. e. under shaft $32^1$, is attached directly to the I-beam, since no sliding motion is required at this end of the saw frame, the swivelling action being sufficient to permit all required adjustments.

Various other modifications may obviously be made in the structure and arrangement of the mounting of the head and the head may be variously adjusted, all without departing from the spirit of my invention if within the limits of the appended claims.

What I therefore claim and desire to secure by Letters Patent is:

1. In a stone sawing machine, a support, a carriage mounted for both angular and vertical adjustment relative thereto, a saw frame mounted to slide relative to said carriage, independently operable devices for raising and lowering one end of said carriage relative to the opposite end thereof, and swiveled connections between said carriage and support for permitting said adjustment, said connections also permitting relative sliding movement of the carriage and support at one end of the frame.

2. In a stone sawing machine, a support, a carriage mounted for both angular and vertical adjustment relative thereto, a saw frame mounted to slide relative to said carriage, independently operable devices for raising and lowering one end of said carriage relative to the opposite end thereof, and nuts connecting said carriage and supports in swivelled relation and having a sliding connection at one end of the carriage and a rigid connection at the opposite end of the carriage.

3. In a stone sawing machine, a support, a carriage mounted for both angular and vertical adjustment relative thereto, a saw frame mounted to slide relative to said carriage, a guide for said frame at the ends thereof, independently operable devices for raising and lowering one end of said carriage relative to the opposite end thereof, and swiveled connections between said carriage and support for permitting said adjustment.

4. In a stone sawing machine, a support, a carriage mounted for both angular and vertical adjustment relative thereto, a saw frame mounted to slide relative to said carriage, a guide for said frame at the ends thereof, means for raising and lowering one end of said carriage relative to the opposite end theerof, without varying the elevation of the opposite end thereof, and swiveled connections between said carriage and support for permitting said adjustment.

In testimony whereof I affix my signature in presence of two witnesses.

JAMES CANNING.

Witnesses:
 REBECCA YETE,
 P. P. PITKIN.